United States Patent
Yokota

(10) Patent No.: US 9,420,151 B2
(45) Date of Patent: Aug. 16, 2016

(54) MULTI-LENS CAMERA SYSTEM, VEHICLE MOUNTING THE MULTI-LENS CAMERA SYSTEM, AND RANGE-FINDING METHOD EXECUTED BY THE MULTI-LENS CAMERA SYSTEM

(71) Applicant: Soichiro Yokota, Tokyo (JP)

(72) Inventor: Soichiro Yokota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 551 days.

(21) Appl. No.: 13/845,860

(22) Filed: Mar. 18, 2013

(65) Prior Publication Data
US 2013/0250109 A1    Sep. 26, 2013

(30) Foreign Application Priority Data

Mar. 21, 2012  (JP) .................................. 2012-063660
Jan. 8, 2013   (JP) .................................. 2013-001370

(51) Int. Cl.
| | | |
|---|---|---|
| *H04N 5/225* | (2006.01) | |
| *G06K 9/20* | (2006.01) | |
| *H04N 5/232* | (2006.01) | |
| *G06T 7/00* | (2006.01) | |
| *G06K 9/00* | (2006.01) | |

(52) U.S. Cl.
CPC .......... *H04N 5/2254* (2013.01); *G06K 9/00805* (2013.01); *G06K 9/00818* (2013.01); *G06K 9/00825* (2013.01); *G06K 9/209* (2013.01); *G06T 7/0075* (2013.01); *H04N 5/23212* (2013.01); *G06T 2207/10012* (2013.01); *G06T 2207/30252* (2013.01)

(58) Field of Classification Search
CPC ............................ G06K 9/209; G06K 9/00791
USPC .......................................... 382/224; 348/148
See application file for complete search history.

(56) References Cited

U.S. PATENT DOCUMENTS

| | | | |
|---|---|---|---|
| 5,721,978 A | 2/1998 | Saito | |
| 6,396,397 B1 | 5/2002 | Bos et al. | |
| 6,822,563 B2 * | 11/2004 | Bos ........................ | B60N 2/002 315/82 |
| 6,853,738 B1 * | 2/2005 | Nishigaki .............. | G01C 3/085 348/139 |

(Continued)

FOREIGN PATENT DOCUMENTS

| | | |
|---|---|---|
| CN | 1677053 A | 10/2005 |
| DE | 19524936 C1 | 11/1996 |

(Continued)

OTHER PUBLICATIONS

Partial European Search Report dated Apr. 9, 2015 issued in corresponding European Application No. 13158677.8.

(Continued)

*Primary Examiner* — Christopher S Kelley
*Assistant Examiner* — Jonathan Messmore
(74) *Attorney, Agent, or Firm* — Harness, Dickey & Pierce P.L.C.

(57) ABSTRACT

A multi-lens camera system includes multiple camera units including respective optical filters and image sensors that acquire a captured image via the optical filter, each of the optical filters having multiple filter regions whose optical characteristics differ respectively, and an image processor, operably connected to the multiple camera unit, to execute different types of image processing on the captured image to form an image that contains multiple image regions whose characteristics differ depending on the optical characteristics of the filter region in which they are acquired.

20 Claims, 9 Drawing Sheets

(56) References Cited

U.S. PATENT DOCUMENTS

| | | | |
|---|---|---|---|
| 7,193,197 B2 * | 3/2007 | Sugiyama | H01L 27/14603 250/208.1 |
| 2002/0135468 A1 | 9/2002 | Bos et al. | |
| 2004/0130731 A1 | 7/2004 | Yamaguchi | |
| 2005/0083184 A1 | 4/2005 | Bos et al. | |
| 2005/0184301 A1 | 8/2005 | Nagasaka et al. | |
| 2007/0177011 A1 * | 8/2007 | Lewin et al. | 348/118 |
| 2008/0252488 A1 | 10/2008 | Bos et al. | |
| 2009/0174804 A1 * | 7/2009 | Iijima et al. | 348/340 |
| 2010/0283837 A1 | 11/2010 | Oohchida et al. | |
| 2011/0211068 A1 | 9/2011 | Yokota | |
| 2012/0053795 A1 | 3/2012 | Bos et al. | |
| 2012/0257060 A1 | 10/2012 | Bos et al. | |
| 2013/0010106 A1 | 1/2013 | Yokota | |
| 2014/0125799 A1 | 5/2014 | Bos et al. | |

FOREIGN PATENT DOCUMENTS

| | | |
|---|---|---|
| JP | H09-61159 A | 3/1997 |
| JP | 2004-173195 | 6/2004 |
| JP | 2004-118638 | 4/2005 |
| JP | 2011-085539 | 4/2011 |
| WO | WO-2011/049149 A1 | 4/2011 |

OTHER PUBLICATIONS

Chinese Office Action dated Dec. 16, 2014 issued in corresponding Chinese Application No. 201310084234.4.

Chinese Office Communication dated Jun. 7, 2016 issued in corresponding Chinese Patent Application No. 201310084234.4.

* cited by examiner

COMPARATIVE EXAMPLE

PARALLAX IMAGE

| H | G | F | E | D | C | B | A | MIN |
|---|---|---|---|---|---|---|---|---|
| 250 | 125 | 100 | 85 | 50 | 30 | 23 | 11 | 2 m |

MULTI-LENS CAMERA SYSTEM, VEHICLE MOUNTING THE MULTI-LENS CAMERA SYSTEM, AND RANGE-FINDING METHOD EXECUTED BY THE MULTI-LENS CAMERA SYSTEM

CROSS-REFERENCE TO RELATED APPLICATION

This patent application is based on and claims priority pursuant to 35 U.S.C. §119 to Japanese Patent Application Nos. 2012-063660, filed on Mar. 21, 2012 and 2013-001370, filed on Jan. 8, 2013 in the Japan Patent Office, the entire disclosures of which are hereby incorporated by reference herein.

BACKGROUND

1. Technical Field

The present invention relates to a multi-lens camera system capable of acquiring parallax information and a vehicle mounting the multi-lens camera system, and a range-finding method executed by the multi-lens camera system.

2. Related Art

Collision avoidance systems involving the use of in-vehicle stereo cameras have become widespread. A stereoscopic image of the area in front of the vehicle is generated using the stereo cameras, and an obstacle is detected and a distance to the obstacle is measured based on the generated stereoscopic image. The driver can then be alerted to take corrective action to avoid a collision or maintain a safe minimum distance between vehicles. Alternatively, the system can engage a control device such as the brakes and the steering.

Further, with improving sensor performance such as higher image resolutions, the focus of vehicle environment sensing has shifted from highway driving to city driving. In the city, the target sensing environment is much more diversified compared to the highway. The biggest problem for recognition processing in a complex sensing environment is that such diversity complicates processing, as a result of which the processing time lengthens and object misrecognition increases.

In recognition processing in the conventional in-vehicle stereo camera, initially, edges are detected over substantially the entire captured image and parallax is calculated for the edge-detected pixel position. Then, by executing clustering using the parallax information which is the calculation result and adding various types of information to the clustering result, the recognition target is finally detected.

FIG. 9 is a flow chart illustrating a general process of object recognition using parallax information. Herein, the recognition targets include a vehicle in front, a pedestrian, a motorbike, a bicycle, a traffic sign, and a traffic light as an object on a road. Initially, using a stereo camera including a reference camera unit and a comparison camera unit like that shown in FIG. 1A, a captured image (stereo image) including a reference image and a comparison image is acquired at step S201. Then, using luminance information in the reference image, a dividing line (e.g., white lines and yellow lines, including stop line) on the road is recognized, at step S208. Along with this process, parallax is calculated based on the reference image and the comparison image at step S202, clustering is executed using the parallax information at step S203, and the clustering result is modified using the size of object, such as the vehicle, the pedestrian, the motorbike, the bicycle, the traffic sign, and the traffic light, at step S204.

FIG. 10 is an object-recognized image obtained by the processes executed at steps S201 through S204. In FIG. 10, reference numeral 100 represents the clustering result recognized as the vehicle object size, 101 represents the clustering result recognized as the pedestrian, the motorbike, and bicycle size, and 102 represents the clustering result recognized as the traffic sign and the traffic light size. As is clear from the object-recognized image of FIG. 10, in particular, since the traffic sign and the traffic light are small, they are often misrecognized, as indicated by frames 102'. In addition, misrecognition of a pedestrian is also seen in an upper region of the image in FIG. 10, indicated by frame 101'.

Various conditional branch processes are executed on these object misrecognitions at steps S205 and later shown in FIG. 9. For example, at step S205, a height of the road surface is calculated based on the dividing line (stop line) recognized at step S208, and the clustering result is modified using target model information for the pedestrian and the fallen object. In addition, at step S206, based on the luminance information in the reference image, a final determination is made regarding the target object for the region for which clustering is executed, using adaptive boosting (AdaBoost). Finally, the three-dimensional position of the recognized object is output at step S207.

In the processes of from steps S201 through S204, if serious object misrecognition occurs or the target object cannot be separately recognized successfully, many complicated processes arise, for example, various conditional branch processing is needed subsequent recognition processing, or previous-stage processing must be revisited. Accordingly, it is important to improve the recognition success rate of the parallax calculation and the clustering, and to minimize misrecognition.

In order to recognize the objects in the images, for example, JP-2004-173195-A proposes a stereo camera system that captures scenery around the vehicle, calculates range data representing two-dimensional distribution of the distance between a camera that outputs color images and a target in a monitoring region, and recognizes another vehicle driving in front in the same lane or in an adjacent lane. Herein, a winker region having a predetermined dimension is set based on the vehicle position in the target-recognized image and a pixel constituting a color component of the winker is detected based on the color image. Accordingly, the winker and the near vehicle can be recognized simultaneously, using the color information and the parallax information. With this configuration, using a combination of the color information and the parallax information, multiple objects can be recognized accurately and simultaneously.

In the above-described method, as for the recognition objects whose color information is known in advance, by detecting the color components of the recognition objects based on the color image acquired by the color camera, the object can be detected accurately. However, it is necessary to provide the color camera in addition to the stereo camera, set the region where the color object is recognized in the image, and perform additional recognition processing using a different algorithm. In addition, in order to calculate the parallax in the entire image and the parallax in the setting region respectively, switching the parallax calculation algorithm and parameter is required. This operation complicates calculation processing and cannot solve the above-described problem.

SUMMARY

In one aspect of this disclosure, there is provided a novel multi-lens camera system includes multiple camera units and an image processor. The multiple camera units include respective optical filters and image sensors that acquire captured images via the optical filters. Each of the optical filters has multiple filter regions whose optical characteristics differ respectively. The image processor, operably connected to the multiple camera units, executes different types of image processing on the captured image to form an image that contains multiple image regions whose characteristics differ depending on the optical characteristics of the filter regions.

In another aspect of this disclosure, there is provided a vehicle including the above-described multi-lens camera system to recognize various types of targets positioned forward of the vehicle; and a vehicle drive control unit to control steering and braking in the vehicle based on the recognition result of the image processor.

In another aspect of this disclosure, there is provided a range-finding method in a multi-lens camera system that has multiple camera units including respective optical filters and image sensors that acquire captured images via the optical filters, each of the optical filters having multiple filter regions whose optical characteristics differ respectively. The method comprising the steps of: capturing images; dividing each of the captured images into multiple regions corresponding to the respective filter regions; calculating parallax information for a first image region in the captured image; performing clustering using the parallax information for the first image region; recognizing another target object for a second image region in the captured image while calculating parallax information and performing clustering using the parallax information for the first image region; modifying the clustering result; calculating parallax information only for the area where the target is recognized in the second image region, while modifying the clustering result for the first image region; and recognizing the target in the first image region and the second image region in the captured image in three dimensions.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
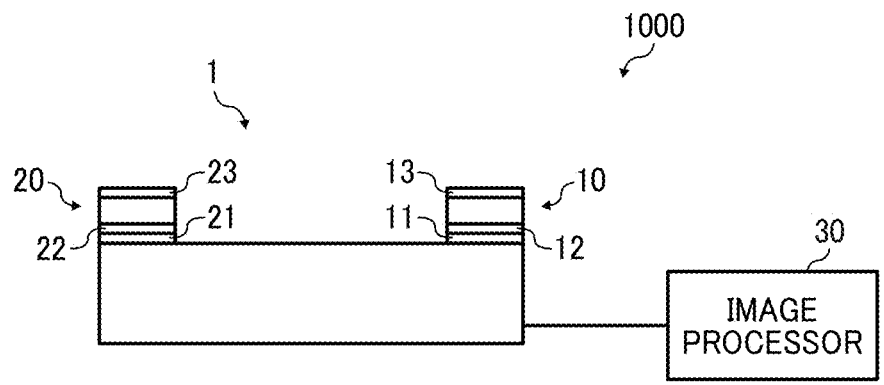
FIG. 1A is a schematic view illustrating a stereo camera in a stereo camera system according to a present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, and particularly to FIGS. 1A through 8, a stereo camera system according to illustrative embodiments of the present disclosure is described.

Figure 1B:
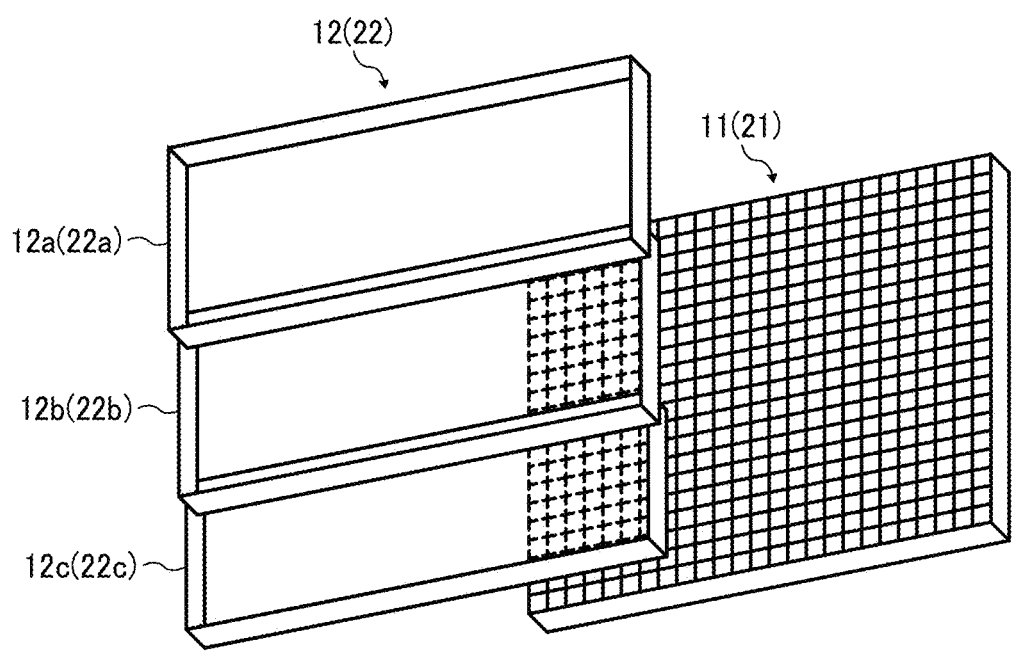
FIG. 1B is an expanded diagram illustrating an image sensor and an optical filter in each of camera units shown in FIG. 1A.

FIGS. 1A and 1B illustrate one example of a stereo camera device 1 in a stereo camera system (range-finding system) 1000 according to a present disclosure. In FIG. 1A, the range-finding system 1000 includes the stereo camera device 1 and an image processor 30 operatively connected to the stereo camera device 1. The stereo camera device 1 includes a reference camera unit 10 and a comparison camera unit 20, each disposed on opposite sides of the stereo camera device 1. The reference camera unit 10 includes an image sensor (image pickup element) 11, an optical filter 12 disposed upon the image sensor 11, and a lens 13 that concentrates light on the image sensor 11. Similarly, the comparison camera unit 20 includes an image sensor (image pickup element) 21, an optical filter 22 disposed upon the image sensor 21, and a lens 23 that concentrates the light on the image sensor 21.

In the range-finding system 1000, the image processor 30 performs parallax calculation and image recognition based on a captured image (sensor image) acquired by the camera units 10 and 20. The stereo camera system 1000 functions as a range-finding apparatus that captures the same object from different viewpoints, and measures a distance to the object and calculates a position of the object, using the fact that the focus on the sensor image changes depending on the distance to the object.

FIG. 1B is an expanded diagram illustrating the image sensor (11) and the optical filter 12(22) in the respective camera units 10(20). In FIG. 1B, the optical filter 12 of the reference camera unit 10 has an identical configuration to that of the optical filter 22 of the comparison camera unit 20. Therefore, images acquired by the image sensors 11 and 21 have the same basic characteristics. Each of the optical filter 12 in the reference camera unit 10 and the optical filter 22 in the comparison camera unit 20 is a special kind of complex filter, which is divided into a color filter region 12a(22a), a clear filter region 12b(22b), and a neutral density (ND) filter region 12c(22c). Accordingly, color information can be detected by using the color filter region 12a, and luminance information can be detected by using the clear filter region 12b and the ND filter region 12c.

Figure 2:
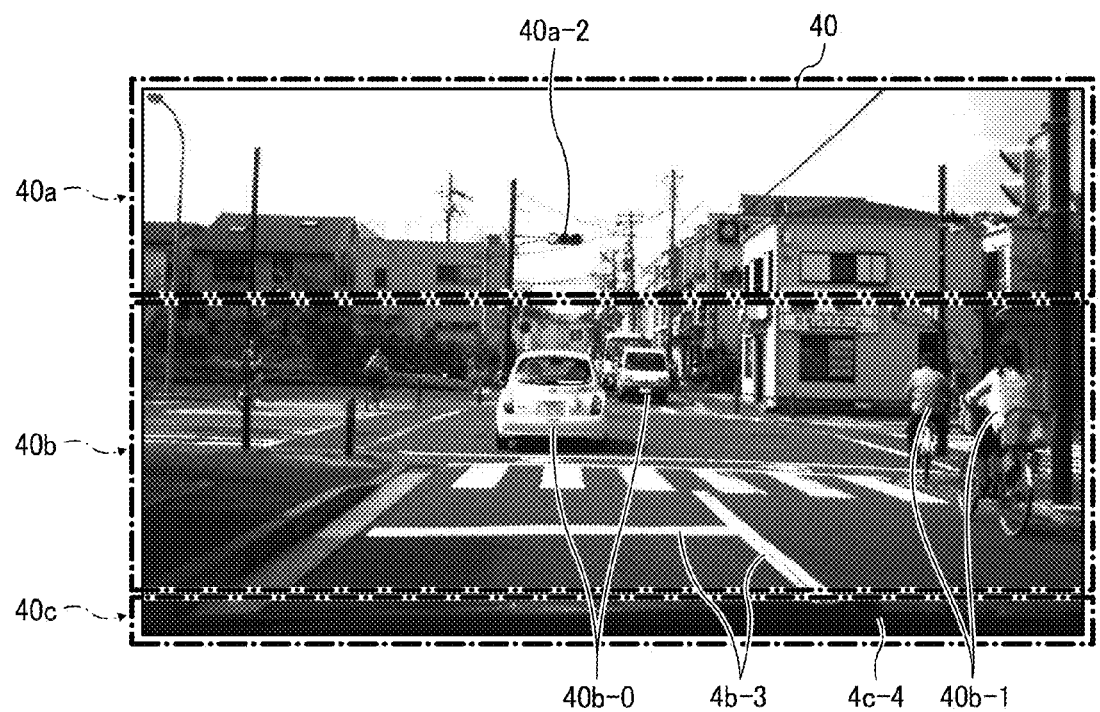
FIG. 2 is a photograph of an image acquired by the stereo camera system shown in FIG. 1B.

FIG. 2 is a photograph of a stereo image (captured image) 40 acquired by the stereo camera system 1000 shown in FIG. 1. The stereo image 40 acquired by the stereo camera device 1 is divided into image regions 40a, 40b, and 40c, which reflect the characteristics of the respective filter regions 12a (22a), 12b(22b), and 12c(22c). It is to be noted that, by providing the clear filter region 12b(12b) in a central image region 40b of the image 40, the other upper and lower regions can be formed by different filters, and the regions can be formed appropriately depending on the information to be detected. In addition, the division of the captured image is not limited to the horizontal direction; alternatively, the regions of the image can be divided in a vertical direction.

In FIG. 2, the image region 40a in the stereo image 40, serving as a second image region, is a color filter corresponding region (color-filter image region) obtained by concentrating the light on the image sensor 11(21) passing through the color filter region 12a. The image region 40b, serving as a first image region, is a clear filter corresponding region (clear-filter image region) obtained by concentrating the light on the image sensor 11(21) passing through the clear filter region 12b(22b). The image region 40c, serving as a third image region, is an ND filter corresponding region (ND filter image region) obtained by concentrating the light on the image sensor 11(21) passing through the ND filter region 12c(22c). In the stereo image 40 having multiple different optical characteristics, the parallax calculation is performed for the clear-filter image region 40b. The clear-filter image region 40b is the region where the sizes of the object (first target object), such as a vehicle in front 40b-0, pedestrian, motorbike, and bicycle 40b-1 are detected. When the stereo camera system 1000 is mounted on a vehicle, the region 40b corresponding to the clear filter region 12b is determined in the captured image 40 by considering a slope, heights of the vehicle 40b-0 and pedestrian 40b-1 around the vanishing point in the captured image 40 in a vertical direction.

Parallax information is very effective to recognize the vehicle 40b-0 and the pedestrian 40b-1, and by calculating the parallax (distance) with high image resolution, the object can be separated with a high degree of accuracy and long-range recognition becomes possible. In addition, in order to calculate collision with another vehicle 40b-0, pedestrian, or bike 40b-1, calculating the distance to the object is necessary. Accordingly, it is preferable that the clear filter 12b be set for this region (central region) and the parallax information be aggressively used for recognition processing.

On the other hand, objects (second target object) such as a traffic sign and a traffic light 40a-2 in the upper region 40a in the stereo image 40 are small, and for that reason are often falsely recognized based on the parallax information. Conversely, since the color of the traffic light and the traffic sign 40a-2 is determined, different from the color of vehicle, by using the color information aggressively more than the parallax information, the object 40a-2 can be recognized effectively. Therefore, the color filter 12a is provided in the upper region, and the camera units 10(20) capture this upper image region 40a as color image.

Herein, when the parallax information is calculated using the color information, executing multiple dimensional parallax calculation is necessary, using RGB and YCRCR, and changing processing time and the algorithm is needed. Accordingly, initially, the traffic sign/traffic light 40a-2 is recognized based on the color-filter upper image region 40a, and then the parallax calculation process using the color image is executed if needed.

In addition, for the lower image region 40c, as a narrowest region, which is not used for the image recognition. In FIG. 2, a hook is seen in the lower image region 40c in the stereo image 40. The ND filter 12c that targets only a light wavelength (luminance information) by emitting LED light is set in the lower image region 40c. Therefore, raindrops 40c-4 can be detected using the unnecessary image region (ND filter image region) 40c in the stereo image 40. Alternatively, if the lower image region 40c is used as the image recognition, a target is set at a very close range. In this case, since the object in the photograph (image) is big in this lower image region 40c, parallax calculation is executed by setting image rough.

As described above, in the stereo camera device 1, the parallax calculation process and use method is variable for the optically divided regions 40a, 40b, and 40c, and the other image information (color information, luminance information) is used actively. Accordingly, the object misrecognition can be alleviated, the recognition success rate is improved, and the cost and space of the stereo camera system 1000 and the vehicle control system can be decreased.

Figure 3:
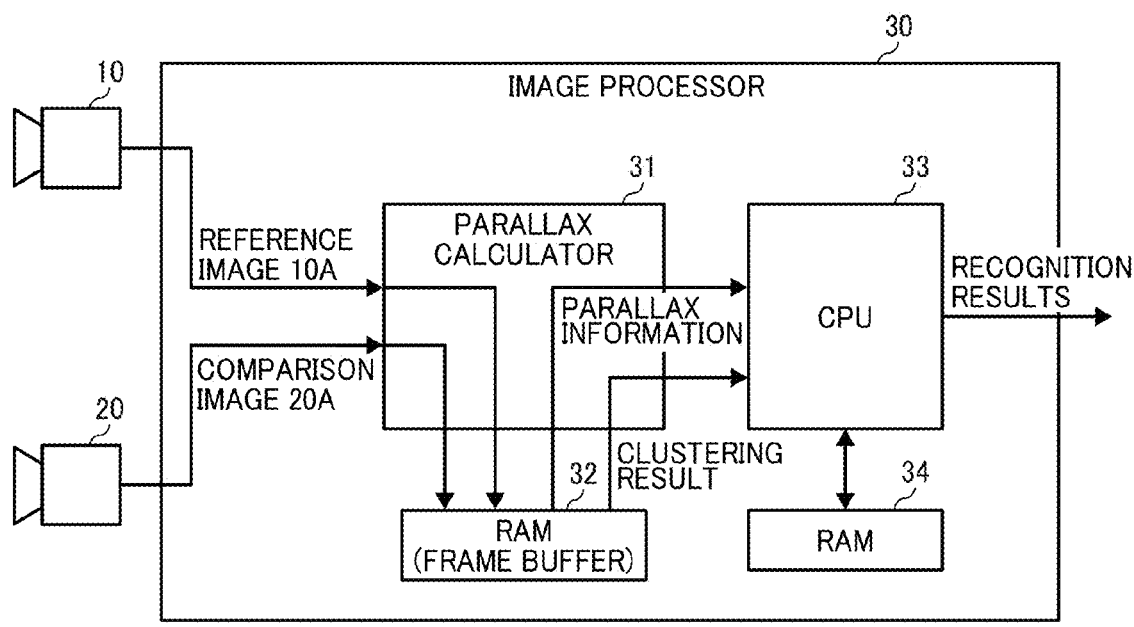
FIG. 3 is a block diagram illustrating a configuration of an image processor in the stereo camera system shown in FIG. 1A.

FIG. 3 is a diagram illustrating a configuration of the image processor 30 in the stereo camera system 1000. As illustrated in FIG. 3, the image processor 30 includes a parallax calculator 31, a random access memory (RAM) 32, a central processing unit (CPU) 33, and a RAM 34. The RAM 32 functions as a frame buffer to which a reference image 10A acquired by the reference camera unit 10 and a comparison image 20A acquired by the comparison camera unit 20 are input. The parallax calculator 31 is constituted by field programmable gate array (FPGA) or application specific integrated circuit ASIC. The CPU 33 executes recognition processing based on color pixel components (RGB pixel components) in the reference image 10A passed through the color filter region 12a and the color pixel components in the comparison image 20A passed through the color filter region 22a. The RAM 34 temporarily stores data and process data executed by the CPU 33.

The process executed by the parallax calculator 31 can be executed by the CPU 33. However, considering processing speed, it is preferable that the parallax calculation process be executed by the hardware configuration. In the process of the parallax calculator 31, if serious object misrecognition occurs and the parallax calculator 31 cannot separate the object suitably, many complicated processes arise, for example, various conditional branch processing is needed subsequent recognition processes, or previous-stage processing must be revisited. Therefore, the next-stage CPU 33 becomes expensive, and the processing time lengthens. In order to response to this problem, it is very important to keep simple process in the parallax calculator 31, improve the recognition success rate of the parallax calculation process, reduce object misrecognition, and then alleviate a processing load on the subsequent CPU 33.

However, the importance of the parallax calculator 31 becomes more significant in the city where the vehicle 40b-0, the pedestrian, motorbike, and bicycle 40b-1, the traffic light/traffic sign 40a-2 are recognized as targets, than in the highway where only the vehicle in front is mainly detected. Accordingly, the parallax calculation process method is set variable, and using other method aggressively, the decrease in the object misrecognition and improve in the recognition success rate become practical, and the cost and space of the stereo camera system 1000 and the vehicle control system can be decreased.

Figure 4:
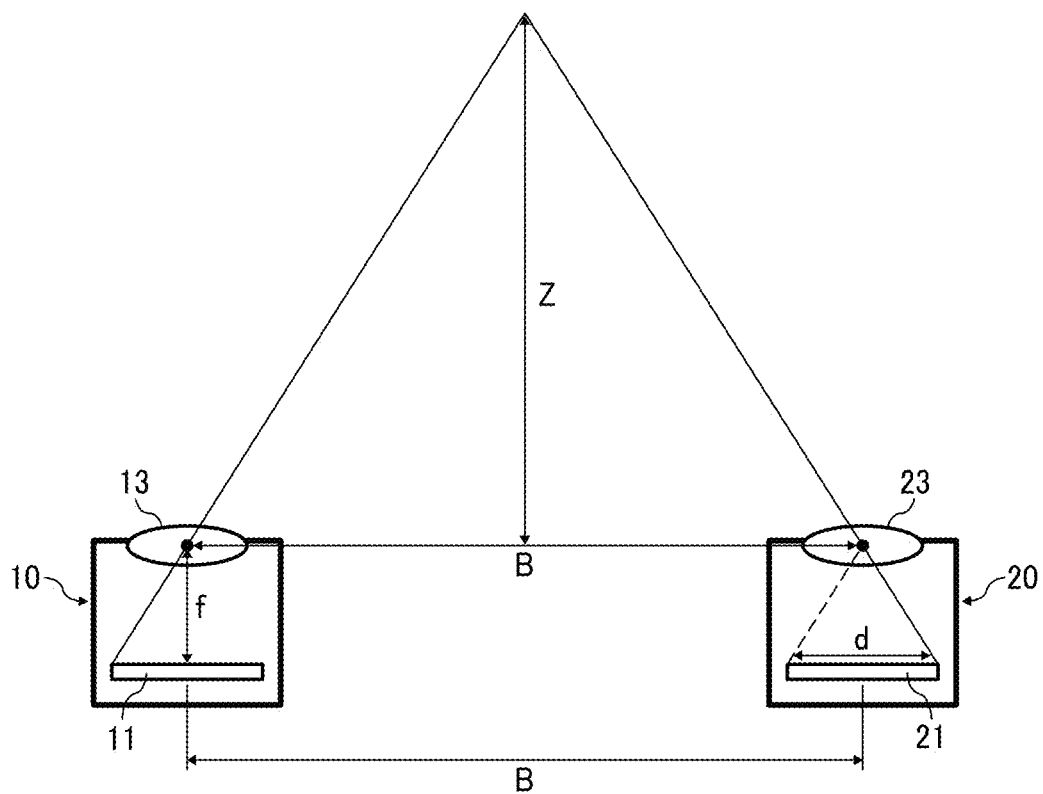
FIG. 4 is a fundamental view illustrating the stereo camera shown in FIG. 1A.

FIG. 4 is a fundamental view illustrating the stereo camera device 1. The image processor 30 computes a distance to the objects, using a baseline length (distance between the reference camera unit 10 and the comparison camera unit 20) B, a focal length f, a parallax (difference in the focus point from viewpoint) d, and a distance Z to the object.

The parallax (disparity) d is calculated based on following formula 1.

$$Z = \frac{B \times f}{d} \quad (1)$$

In the formula 1, a reference numeral d represents a corresponding position between the reference image 10A acquired by the reference camera unit 10 and the comparison image 20A acquired by the comparison camera unit 20. The position d is generally calculated by block-matching using vicinity pixels around an attention pixel. For example, assuming that the block size of frame containing the vicinity pixels is set at 9×9 block, the parallax d is calculated based on sum of absolute difference (SAD) like that represented as a following formula 2.

$$R_{SAD} = \sum_{j=1}^{9} \sum_{i=1}^{9} |I(i,j) - C(i,j)| \quad (2)$$

As for a block matching method, other than SAD, various methods, such as, Sum of Squared Differences (SSD), Normalized Cross Correlation (NCC), and Zero-mean Sum of Absolute Differences (ASAD) are proposed, and any method can be used for this disclosure.

Using this block-matching parallax calculation method, pixels in the comparison image (or decimal interpolated sub-pixel composite image) are calculated one by one for a target pixel in the reference image, and the most correlated position is computed as the parallax "d".

As described above, to search the parallax about certain pixels, a process for the pixels corresponding to at least equal to or over the assumed parallax d is needed, and therefore, an enormous amount of time is required. For example, assuming that a search length (width) w where the parallax d is searched while the pixel is shifted per one pixel is 64 pixels, the processing time to execute parallax calculation for a certain image takes 64 times as long as the processing time for one pixel, even if a time period in which the parallax d is searched for 1 pixel is set at 1 clock cycle. However, in general, a setting that a time period in which correlation value is searched for 1 pixel is at 1 clock cycle is impossible, and the processing time is exponentially increased based on the block size used for calculating correlation value. Therefore, reducing the parallax calculation time is major issue. The parallax calculation is represented as a general forms, as following formula 3.

$$T = N \times (t \times w) \quad (3)$$

Figure 9:
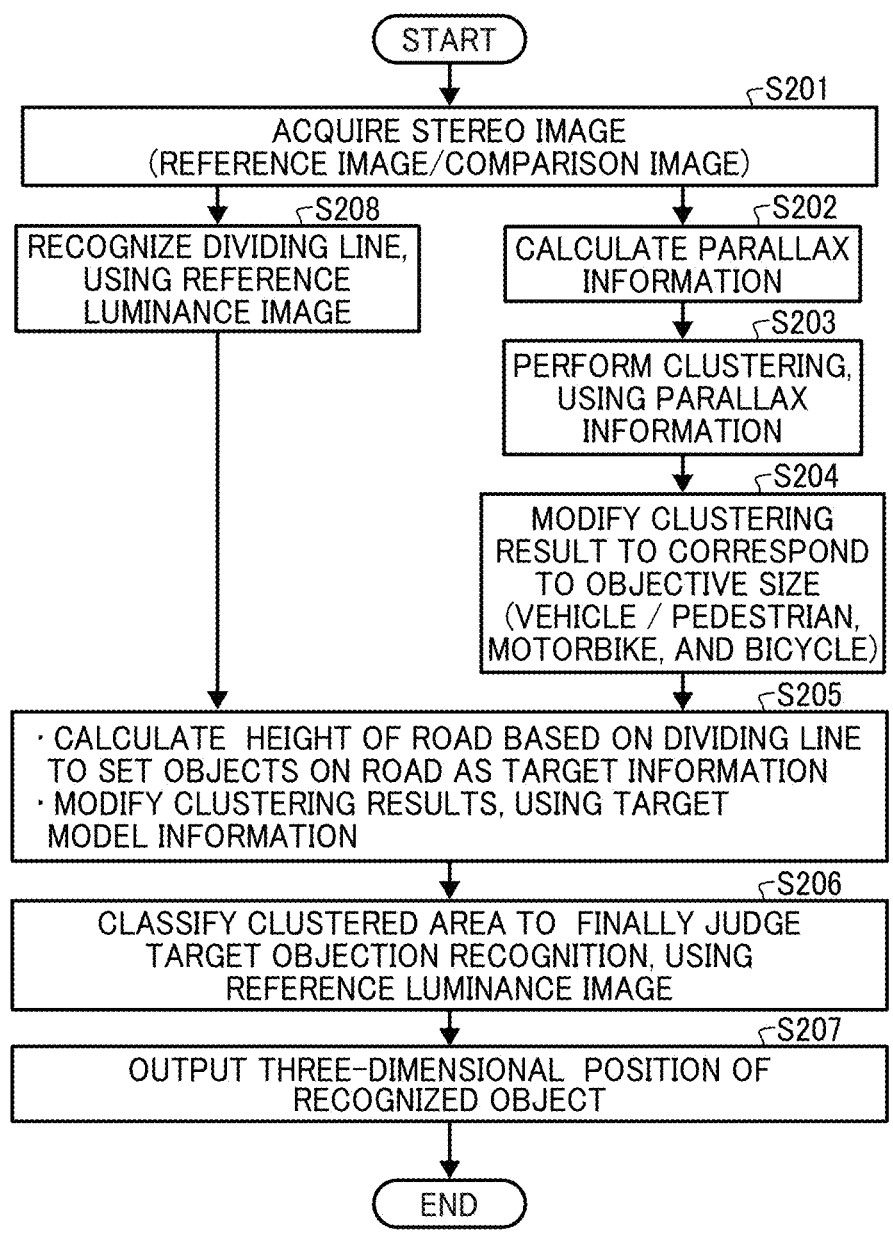
FIG. 9 is a flow chart illustrating a related-art process of object recognition using parallax information.
Figure 10:
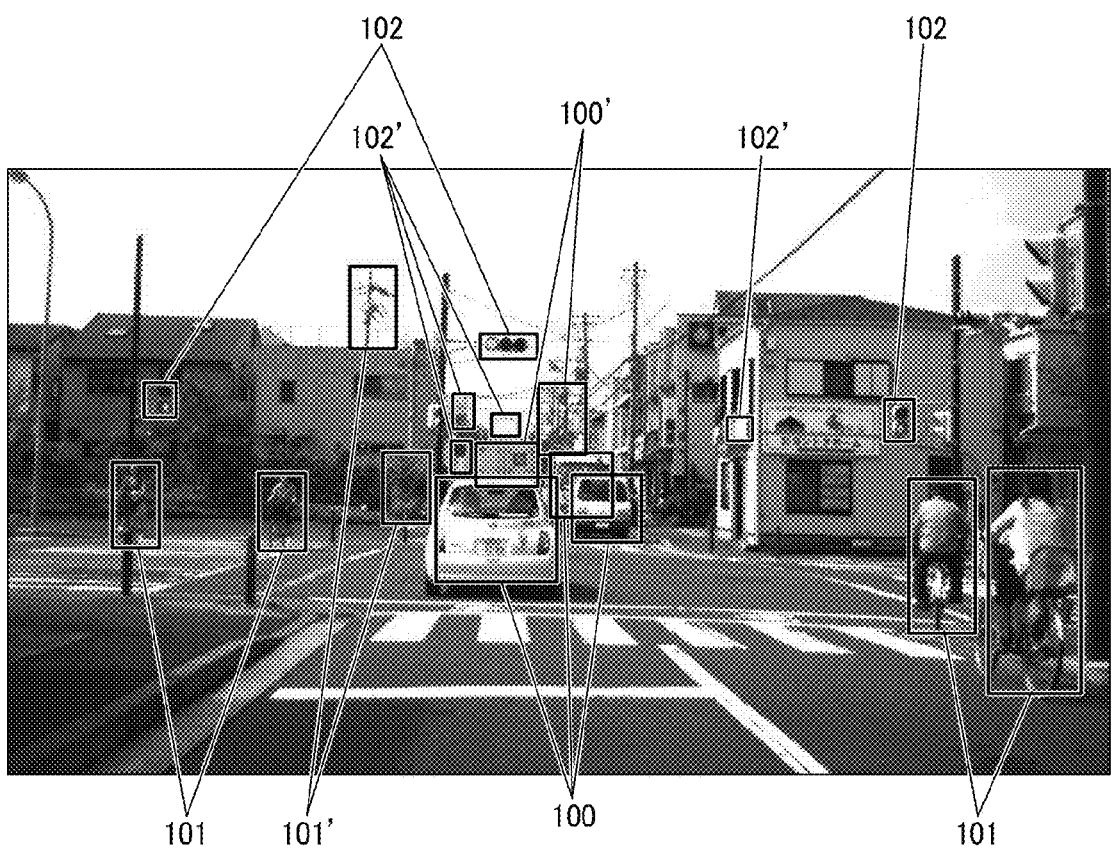
FIG. 10 is an object-recognized image obtained by processes executed at steps S201 through S204 shown in FIG. 9.

In the formula, T represents a parallax calculation time for one image, N represents number of pixels of parallax calculation, t represents related calculation time per pixel, and w represents the search width. This calculation formula 3 corresponds to a process at step S202 in FIG. 9, and shortening this processing time is one of solving way to the issue. In order to solve this issue, in the present embodiment, this parallax calculation is executed only for the clear-filter image region 40b.

Figure 5:
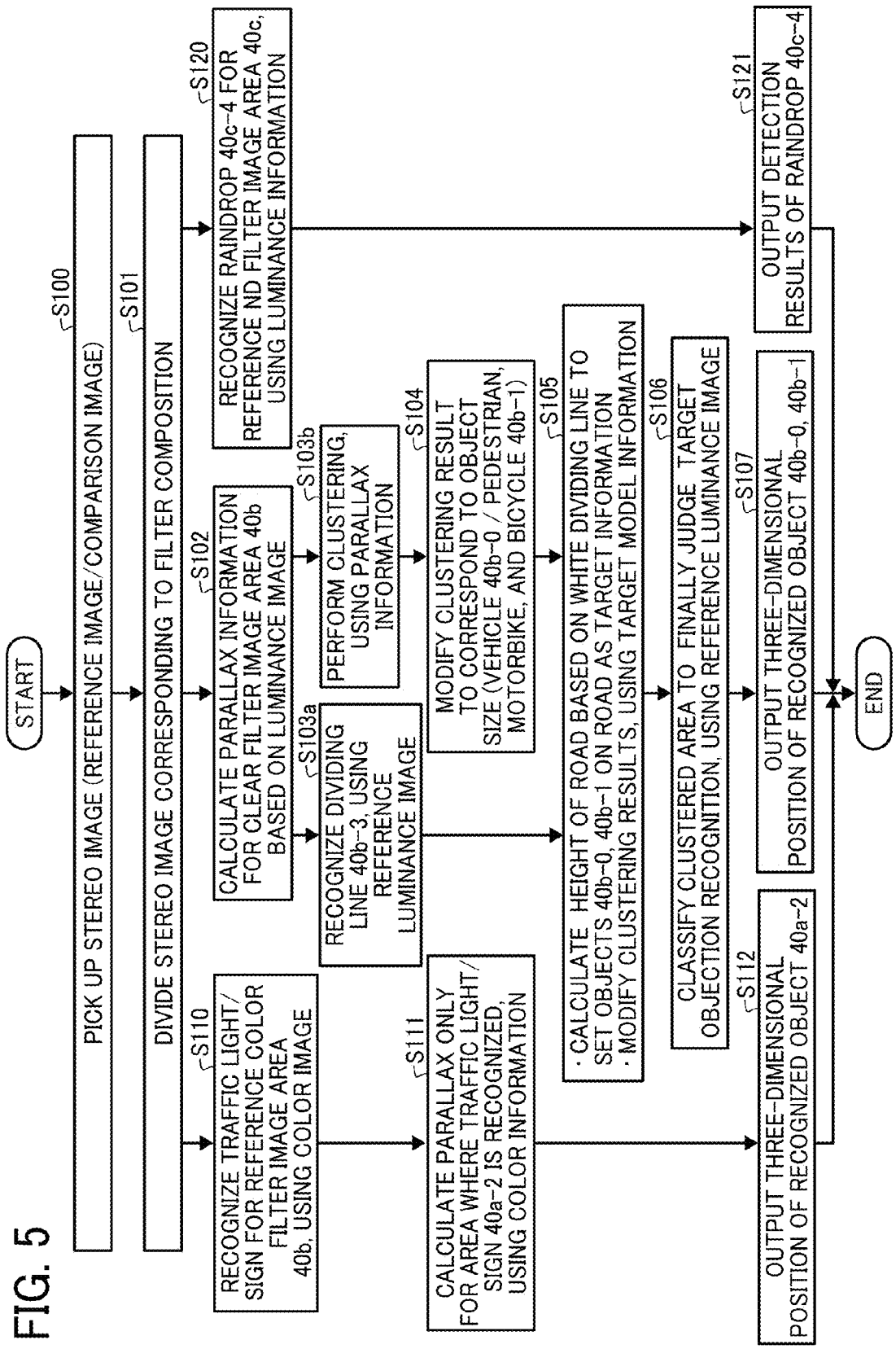
FIG. 5 is a flow chart illustrating a process executed by the stereo camera system shown in FIG. 1B.

FIG. 5 is a flow chart illustrating a process in the stereo camera system 1 in the present disclosure. Initially, the reference camera unit 10 and the comparison camera unit 20 capture the reference image 10A and the comparison image 20A as stereo images (captured images) at step S100. Then, each of the reference image 10A and the comparison image 20A is divided based on the filter component of the filters 12 and 22 shown in FIG. 1B at step S101. By passing the respective filter regions 12a, 12b, and 12c, different processes are executed for the image regions 40a, 40b, and 40 whose optical characteristics differ respectively.

<Process in the Clear-Filter Image Region 40b>

In the image shown in FIG. 2, the two items of luminance information of the clear-filter image regions 40b in the reference image 10A(40) and the comparison image 20A(40) are input to the parallax calculator 31 shown in FIG. 3, the parallax calculation using the luminance image (luminance information) described with FIG. 4 is executed at step S102. In particular, since the parallax calculation process at step S102 needs much time, though the process is simple, executing the parallax calculation process by the hardware configuration is necessary. Then, in the parallax calculator 31, using the clear-filter image region 40b in the reference image 10A, to recognize the dividing line (stop line) in the road at step S103a, and to execute the clustering at step S103a, using the parallax information calculated at step S103b. The clustering results are modified based on the own vehicle size and the sizes of the objects such as vehicle 40b-0, pedestrian, motorbike, and bicycle 40b-1, at step S104.

Then, using target model information, the clustering results are modified at step S105. For example, the height of the road is calculated based on the data of the dividing line 40b-3 recognized at step S103a, and the objects 40b-0 and 40b-1 on the dividing line 40b-3 is used as the target model. Then, based on the luminance information of the reference image 10A, final determination is made regarding the target object 40b-0 and 40b-1 for the region for which clustering is executed, using adaptive boosting (Adaboost), at step S106. With these processes, the parallax calculator 31 outputs three-dimensional positions of the recognized objects 40b-0 and 40b-1 at step S107.

<Process in the Color-Filter Image Region 40a>

Herein, the process for the color-filter image region (central region) 40a is not executed in the parallax calculator 31, but the data is transmitted to the CPU 33, and the CPU 33 executes recognition processing of the traffic light and the traffic sign 40a-2 in the color-filter image region 40a. Using the color-filter image region 40a of the reference image 10A (40) divided at the step S101, the CPU 33 recognizes the traffic light and the traffic sign 40a-2 at step S110. Then, the CPU 33 performs the parallax calculation only for the result area where at least one of the traffic light and the traffic sign 40a-2 is recognized, using the color information detected in both the reference image 10A and the comparison image 20A, at step S111. The CPU 33 outputs the three-dimensional positions about the recognized objects of the traffic light and the traffic sign 40a-2 at step S112.

As described above, the parallax calculator 31 performs the parallax calculation for the result area in the color-filter image region 40a, recognized by the CPU 33. At this time, the parallax calculator 31 is needed to perform the parallax calculation for the color-filter image region 40a whose type is different from that executed for the clear-filter image region 40b.

Since the color image is represented as R, G, B, or YCnCr, the color information used for the parallax calculation is not one dimension, as the luminance information of the monochrome image. The parallax calculation for the color image is generally required to take over 3 times longer than that for the luminance image.

In addition, in the parallax calculation for the color image, although the object misrecognition can be alleviated because the matching process is performed based on the multiplex information, the parallax cannot be calculated for the entire pixels, unlike the clear-filter image region 40b. In addition, the focused points passed through the lenses 11 and 21 are not uniform in the entire pixels, unlike the luminance image, and thus, measuring distance with a high degree of accuracy becomes impractical. Therefore, this color lens is not suit for calculating the parallax for the faraway objects. Accordingly, it is preferable that the parallax be calculated only for the recognized area in the color-filter image region 40a where the objects of the traffic light/traffic sign 40a-2 are recognized by using the color information.

In addition, when the parallax is calculated for the recognized portion in the color-filter image region 40a, since purpose in use is different from the parallax calculation for the luminance information in the clear-filter image region 40b, suitable algorithm and parameter of the parallax calculation for the color image is differ from that for the luminance image.

For example, when the color objects 40a-2 are detected in the image, it is necessary to calculate the parallax in the entire image initially and then to measure the distance to the object 40a-2, considering the dispersion of the color parallax. Accordingly, it is preferable that the block matching be applied for the image where the image difference among the pixels or between the adjacent pixels is large, using more simple method.

By contrast, when it appears that a certain object is acquired in a certain portion in the reference image 10A, the entirety of that portion is treated as a single lump and the comparison image 20A is searched for a lump having characteristics identical to those of the acquired lump. As for these methods, not block matching but, for example, phase limitation correlation using spatial frequency characteristics is effective for this parallax calculation.

<Process in the ND Filter Image Region 40c>

As for the ND filter image region 40c, the data is not executed in the parallax calculator 31 but is transmitted to the CPU 33, and the CPU 33 recognizes the raindrops 40c-4. The CPU 33 does not execute the parallax calculation because the range to the raindrops 40c-4 need not be found. At step S120, the CPU 33 recognizes the raindrops 40c-4, using the luminance image for the ND filter image region 40c in the reference image 10A at step S120. Then, the CPU 33 outputs the detection results for the raindrops 40c-4 at step S121.

Figure 6A:
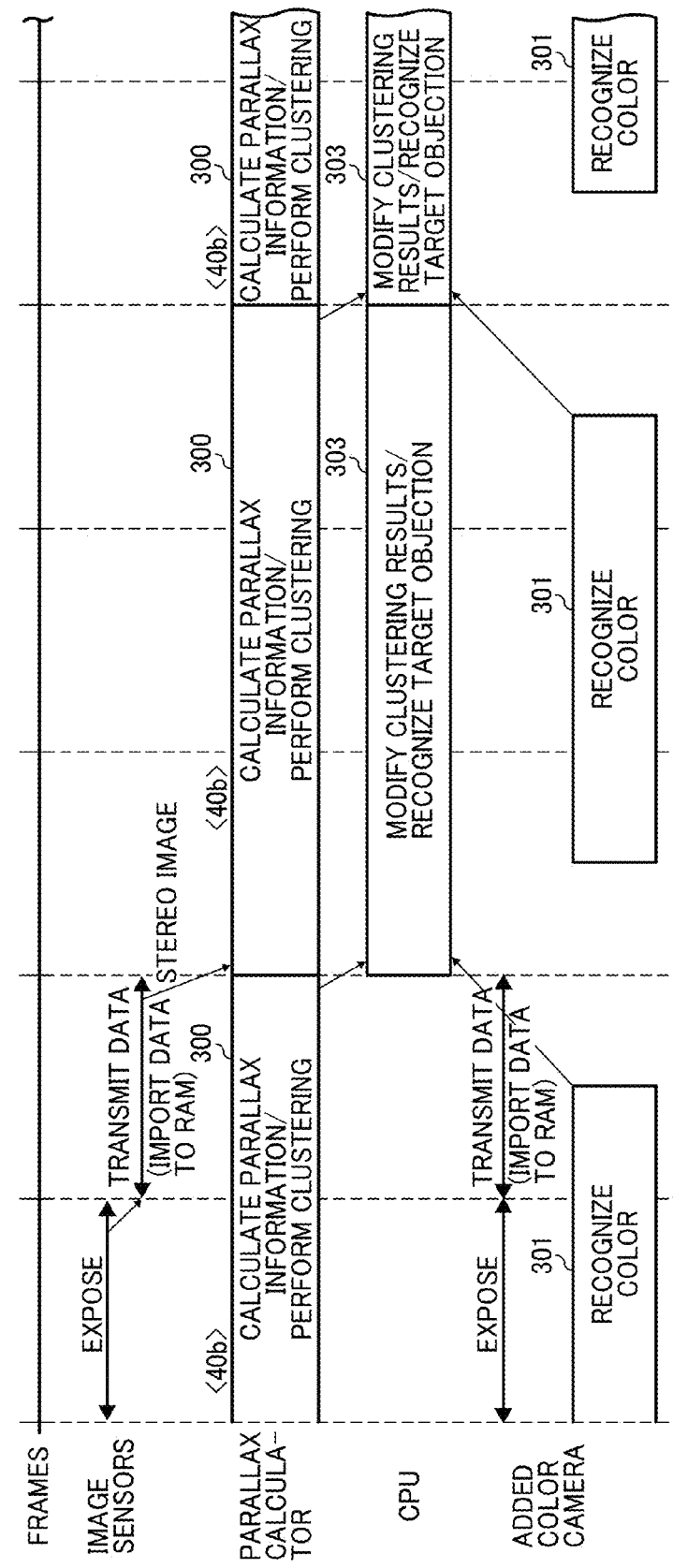
FIG. 6A is a timing chart illustrating a comparative example of a stereo camera system in which the parallax is calculated for an entire captured image.
Figure 6B:
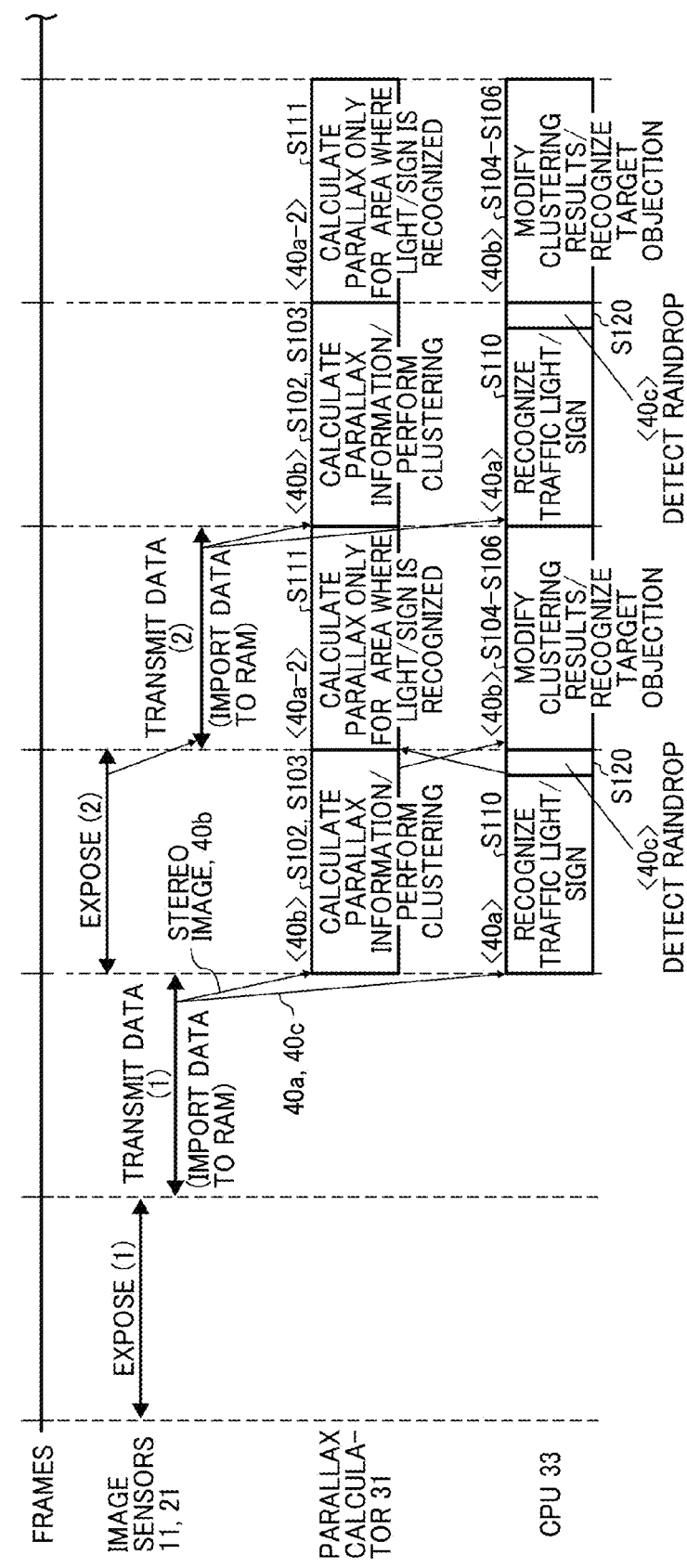
FIG. 6B is a timing chart illustrating the stereo camera system shown in FIG. 1B, in which the parallax is calculated for only a predetermined region in the captured image.

FIGS. 6A and 6B are timing charts illustrating the elements of the distance measuring (ranging) process in the stereo camera system. FIG. 6B illustrates respective flows in the stereo camera system 1000 in which the parallax is calculated for only the regions 40b and the predetermined area of the region 40a in the captured image 40 shown in FIG. 1B.

Figure 7:
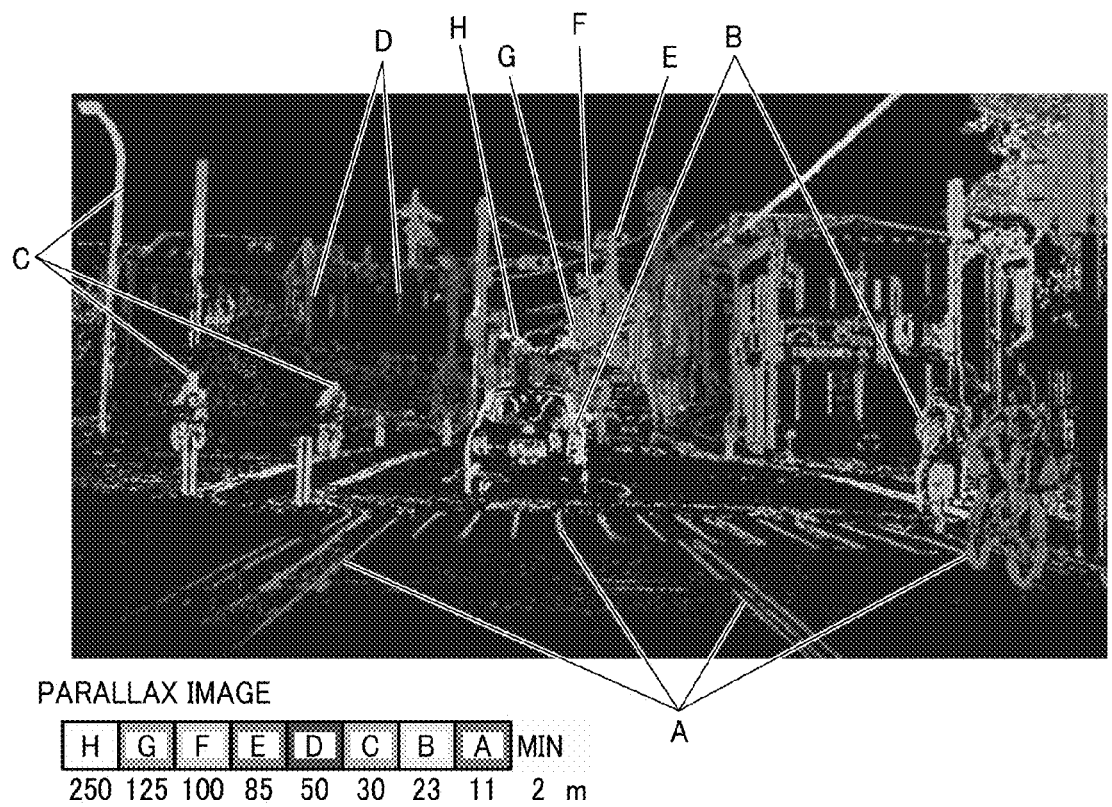
FIG. 7 is a parallax image after the parallax is calculated and clustering is executed in the comparative example shown in FIG. 6A.

FIG. 6A is a timing chart illustrating a comparative example of a stereo camera system in which the parallax calculator executes the parallax calculation and clustering for the entire images based on the luminance, at the process step S300, executes recognition processing for the color image acquired by the color camera set at separately at step S301, and modifies the process results at process at step S303 based the recognition result of the process at step S301. In the flow shown in FIG. 6A, the parallax calculation and the clustering are executed for the entire image based on the luminance, this process at step 300 takes 3 frames. The parallax image executed by the process at step 300 is illustrated in FIG. 7. FIG. 7 is a parallax image after the parallax is calculated and clustering is executed in FIG. 6A. To recognize the color image takes a long processing time and causes many object misrecognitions.

By contrast, in the present embodiment, the optical filters 12 and 22 are constituted by a special type of the optical filter (complex optical filter) as illustrated in FIG. 1B, and the parallax calculation logic suitably to the respective regions is applied. Accordingly, the process of the color recognition and the parallax calculation can be executed by only single camera image 40. In addition, the process method for the corresponding region are changed, and therefore, the process in the CPU 33 and the parallax calculator 31 can be effectively used, as illustrated in FIG. 6B. That is, in the present embodiment, the clear-filter image region 40b is set at one-third in the entire image 40, and the parallax calculation in the parallax calculator 31 can be executed within 1 frame that is one-third time of the parallax calculation process shown in FIG. 6A. With reference to FIG. 6B, after the processes at the steps S102 and S103 are executed within 1 frame, the process at step S112 can be performed in the subsequent frame at step S111.

Along with these processes, the CPU 33 can perform the processes at steps S110 and S120 within one frame, and performs the processes at steps S101 through S106 within the subsequent frame. In the present embodiment, the efficiency in the process is greatly high. Further, adding the recognition for the color image, the ranging using the color information becomes possible. This is the reason why the color image suitable portion where the target of the traffic light/traffic sign 40a-2 is recognized in the color-filter image region 40a is detected as the recognized portion (recognized target area), and the then, parallax calculation is executed for only the recognized portion. It is to be noted that, in order to be made this process possible, switching in the parallax calculation algorithm, corresponding to the optical filter captured image and the recognition method, and switching in the parameter are needed.

In general, when the entirely-different parallax calculation logics are applied, different types of parallax calculation logics have to be implemented in the parallax calculation hardware (parallax calculator). Depending on the required accuracy of the recognized portion, general block-matching algorithm may be used. In this case, when the general block-matching algorithm is applied to the images whose optical characteristics are different, only changing the block size is not enough to calculate the parallax.

For example, in the color image region, since the image is focused on the pixels through the RGB color filter, when the primary image whose color is not interpolated is used, the search widths of the respective filter separated image regions are changed, or when the image whose color is interpolated is used, the amount of pixel information after the color is interpolated differs among the respective regions.

As described above, in the present disclosure, by dividing the filter and formed image into the central region 40b where the parallax calculation is executed based on the luminance, the upper region 40a where the image can be rather effectively recognized using the color image, depending on the application and the recognition target, the object misrecognition by the parallax calculator 31 can be alleviated and the recognition success rate can be improved.

In addition, the parallax calculation logic can be applied for the respective divided regions effectively, and unnecessary calculating can be reduced. Furthermore, since the region where the parallax calculation using the luminance information is executed can be limited, the processing load on the parallax calculator 31 can be minimized, thereby reducing the cost of the parallax calculator 31 and the CPU 33. In addition, providing an additional sensor for detecting the raindrops 40c-4, an additional color camera for recognizing the color information and constituting the color stereo camera whose processing load is great becomes unnecessary. Accordingly, the utility stereo camera can operate multiple applications, resulting in reduced cost and size of the stereo camera system.

In the present disclosure, the stereo camera system 1000 optically devises the optical filters 12 and 22 so that the (acquired) stereo image can be divided into multiple regions corresponding to the recognition targets, and the image sensors 11 and 21 can capture the image in a form suitable for recognition processing.

Accordingly, organizing the recognized target, arranging the regions to capture the target, constructing the special type of the optical filters (complex filters) 12 and 22 suitable for the recognition, changing the algorithm of the parallax calculation logic, and changing thinning out image rate and the position detected algorithm of the parallax calculation executed pixels in accordance with the image characteristics of the special type filter and the recognition method, the object misrecognition can be alleviated and the recognition target can be expanded.

Furthermore, with this improvement of the characteristics, the entire process can be sped up. In the above-described embodiment, the stereo camera system includes two camera lenses, similar configuration and basis can be applied, the stereo camera system can install over two distance measuring (ranging) cameras.

<Vehicle>

Figure 8:
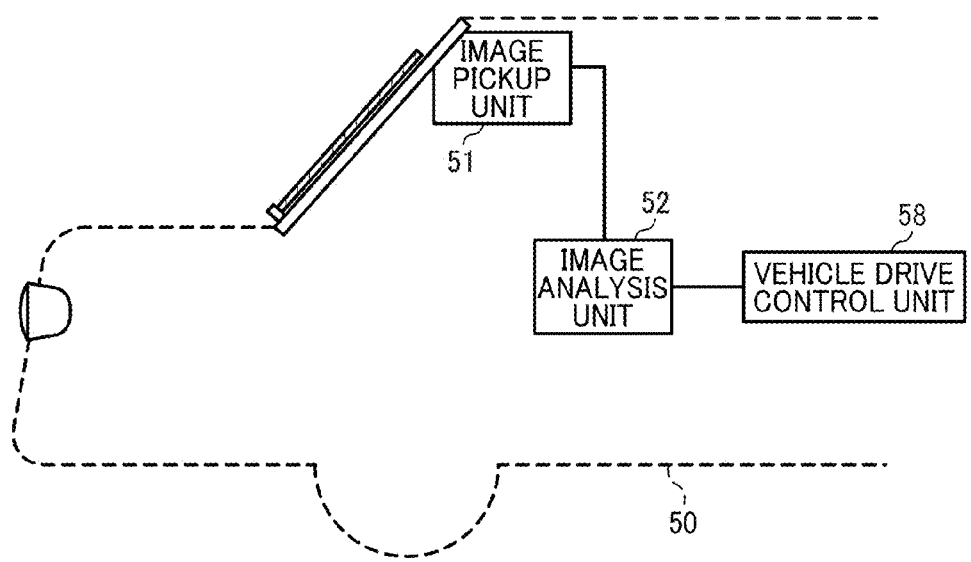
FIG. 8 is a schematic diagram illustrating a vehicle mounting the stereo camera system shown in FIG. 1A.

FIG. 8 is a schematic diagram illustrating a vehicle 50 mounting the present stereo camera system 1000 (rangefinding device). An image processing system in the vehicle 50 includes a pickup unit 51 to acquire the image forward the vehicle 50 and an image analysis unit 52 that calculates the distance from another vehicle driving in front of the vehicle 50 based on the image captured in the pickup unit 51. The image pickup unit 51 is positioned near a rearview mirror in the vehicle 50 so that the image pickup unit 51 can capture the image forward of the vehicle 50 containing another vehicle driving in front of the vehicle 50 and calculate a distance to another vehicle from the vehicle 50. The image of the vehicle in front acquired by the image pickup unit 51 is input to and converted into the image signal for output to the image analysis unit 52. The image analysis unit 52 analyses the output image signal from the image pickup unit 51. As for the image pickup unit 51, the stereo camera device 1 of the present embodiment composed of the reference camera unit 10 and the comparison camera unit 20 can be used. As a part of function of the image analysis unit 52, the parallax calculator 31 and the CPU 33 can be applied.

A vehicle drive control unit 58 can control the steering and the brake of the vehicle 50 based on the distance from the vehicle in the front calculated by the image analysis unit 52.

Numerous additional modifications and variations are possible in light of the above teachings. It is therefore to be understood that, within the scope of the appended claims, the disclosure of this patent specification may be practiced otherwise than as specifically described herein.

What is claimed is:

1. A multi-lens camera system comprising:
multiple camera units, the multiple camera units include multiple optical filters and multiple image sensors, the multiple image sensors capture images via the multiple optical filters, each of the multiple optical filters include multiple filter regions, each of the multiple filter regions include different optical characteristics respectively, the multiple filter regions include a clear filter region which corresponds to a central image region of the captured images and a color filter region which corresponds to an upper image region of the captured images; and
an image processor operably connected to the multiple camera units, the image processor configured to,
execute different types of image processing on the captured images to form an image that contains multiple image regions, each of the multiple image regions include different characteristics depending on the optical characteristics of the multiple filter regions, the multiple image regions include the central image region and the upper image region,
perform a parallax calculation for the clear filter region of the central image region of the captured images, and
recognize a target in the color filter region of the upper image region of the captured images based on color information.

2. The multi-lens camera system of claim 1, wherein the image processor is configured to recognize the target in the captured images by multiple different image recognitions, the multiple different image recognitions differing from each other depending on the multiple image regions.

3. The multi-lens camera system of claim 2, wherein the image processor is configured to recognize the target in the captured images using the parallax information obtained between the central image region in the captured images and color information in the upper image region.

4. The multi-lens camera system of claim 1, wherein the image processor is configured to recognize another target in a lower image region of the captured images using the parallax information obtained between the central image region in the captured images and a luminance information in the lower image region.

5. A vehicle comprising:
a multi-lens camera system including,
multiple camera units, the multiple camera units include multiple optical filters and multiple image sensors, the multiple image sensors acquire captured images via the multiple optical filters, each of the multiple optical filters include multiple filter regions, each of the multiple filter regions include optical characteristics that differ from each other respectively, the multiple filter regions include a clear filter region which corresponds to a central image region of the captured images, and
an image processor, the image processor operably connected to the multiple camera units, the image processor configured to,
process the captured images into multiple image regions, the multiple image regions includes the central image region, each of the multiple image regions include characteristics that differ depending on the optical characteristics of the multiple filter regions, the differing characteristics of the multiple image regions configured to recognize various types of targets that are positioned ahead of a vehicle, and
perform a parallax calculation for the clear filter region of the central image region of the captured images; and
a vehicle drive control unit, the vehicle drive control unit configured to control steering and braking of the vehicle based on a recognition result provided by the image processor.

6. The vehicle of claim 5, wherein the image processor is further configured to divide the captured images into the multiple image regions, the multiple image regions includes the central image region where an object in the central image region is recognized as a target using the parallax calculation.

7. The vehicle of claim 6, wherein the image processor is further configured to, recognize a dividing line on a surface and the target in the central region in the captured images, wherein recognizing the dividing line based on a luminance information of a lower image region, and recognizing the target in the central image region of the captured images in three dimensions;

calculate the parallax information for the central image region in the captured images and a height of the surface, wherein calculating the parallax information based on the luminance information of the lower image region, and calculating the height of the surface based on the dividing line;

perform clustering results using the parallax information; and modify the clustering results based on a size of the object in the central image region that is recognized as the target using the parallax calculation, the object in the central image region includes at least one of another vehicle ahead of the vehicle, a pedestrian, a motorbike and a bicycle.

8. The vehicle of claim 7, wherein the image processor is configured to divides the captured images into the multiple image regions, the multiple image regions includes an upper image region where an object in the upper image region is recognized as the target using color information of the upper image region, the object in the upper image region includes at least one of a traffic light and a traffic sign.

9. The vehicle of claim 8, wherein the image processor is configured to, recognize the object in the upper image region using color information of the upper image region in three dimensions during calculation of the parallax information and clustering results using the parallax information for the object in the central region in the captured images, calculate parallax information only for the object in the upper image region using the color information of the upper image region during modification of the clustering results based on the size of the object in the central region that is recognized as the target using the parallax calculation.

10. The vehicle of claim 7, wherein the image processor is configured to divide the captured images into the multiple image regions, the multiple image regions includes the lower image region where an object in the lower image region is detected using the luminance information, the object in the lower image region is a raindrop.

11. The vehicle of claim 10, wherein the image processor is configured to detect the object in the lower image region during calculation of the parallax information for the central image region in the captured images and modifying of the clustering results using the parallax information for the central image region in the captured images.

12. A range-finding method in a multi-lens camera system that includes multiple camera units, the multiple camera units include multiple optical filters and multiple image sensors, the multiple image sensors capture images via the multiple optical filters, each of the multiple optical filters include multiple filter regions whose optical characteristics differ respectively, the method comprising:

dividing each of the captured images into multiple image regions, each of the multiple image regions include characteristics that differ depending on the optical characteristics of the multiple filter regions, the multiple image regions includes a first image region and a second image region;

recognizing a first target object and a second target object, the first target object is recognized in the first image region of the captured image in three dimensions, the second target object is recognized in the second image region of the captured image in three dimensions;

calculating parallax information for the first image region in the captured image and parallax information for the second image region in the captured image, the parallax information for the first image region is calculated while subsequently recognizing the second target object in the second image region, and parallax information for the second image region is only calculated when the second target object is recognized in the second image region of the captured image;

performing clustering results using the parallax information for the first image region, wherein recognizing of the second target object in the second image region is performed during the clustering results for the first image region; and modifying the clustering results for the first image region, wherein calculating parallax information only for the second target object in the second image region is performed during modifying the clustering results for the first image region.

13. The range-finding method of claim 12, further comprising:

detecting an object in a third region of the captured images, the object in the third region is detected during calculating the parallax information for the first image region and performing clustering results using the parallax information for the first image region.

14. The method of claim 12, wherein the multiple image regions include an upper image region, the upper image region corresponds to a color filter region.

15. The method of claim 12, wherein the multiple image regions include a lower image region, the lower image region corresponds to a neutral density filter region.

16. The method of claim 12, wherein modifying the clustering results based on a size of the first target object recognized in the first image region of the captured images.

17. The method of claim 16, wherein the first target object includes at least one of a vehicle in front, a pedestrian, a motorbike, and a bicycle.

18. The multi-lens camera system of claim 1, wherein the target recognized in the color filter region of the upper image region by the image processor includes at least one of traffic signal and traffic sign.

19. The multi-lens camera system of claim 1, wherein the parallax calculation is configured to be performed by a hardware, and recognition of a target is configured to be performed by executing a set of computer readable instructions.

20. The multi-lens camera system of claim 1, wherein the image processor is configured to perform the parallax calculation also for the color filter region, and the parallax calculation for the color filter region is performed only on the target recognized in the color filter region of the upper image region of the captured image.

* * * * *